Aug. 27, 1963　　　S. BÖHM ET AL　　　3,101,657
PHOTOGRAPHIC CAMERAS FITTED WITH FOCAL PLANE SHUTTER
Filed Sept. 19, 1957　　　　　　　　　　　　　7 Sheets-Sheet 1

INVENTOR.
Siegfried Böhm
Friedrich Winkler
Horst Fischer
BY

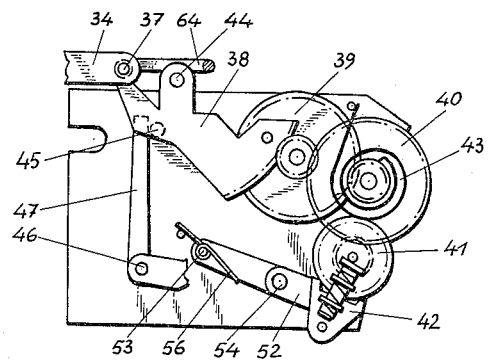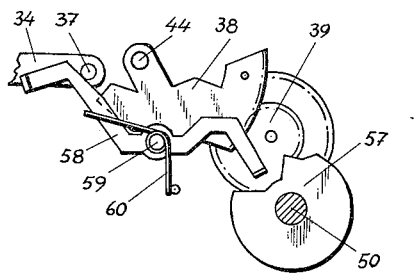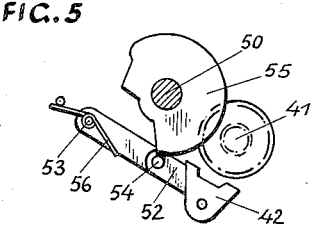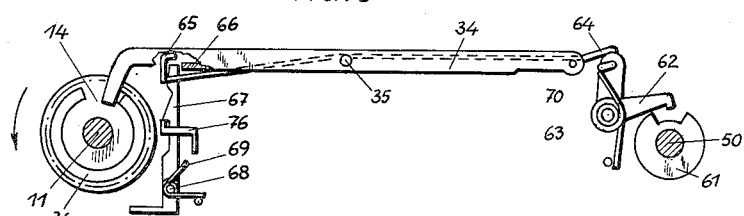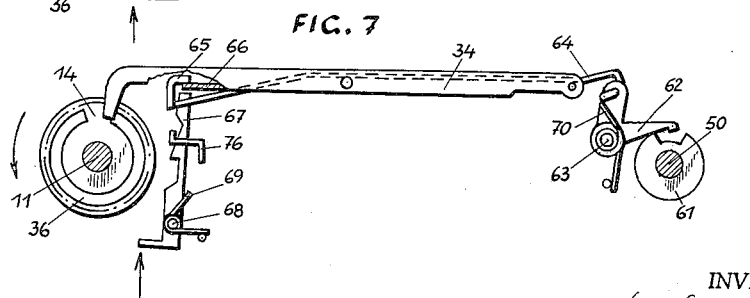

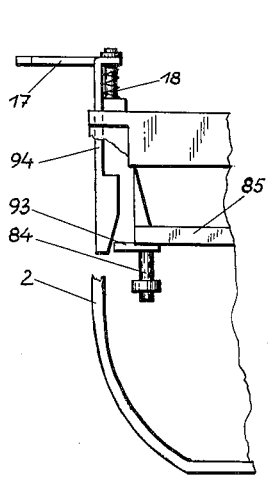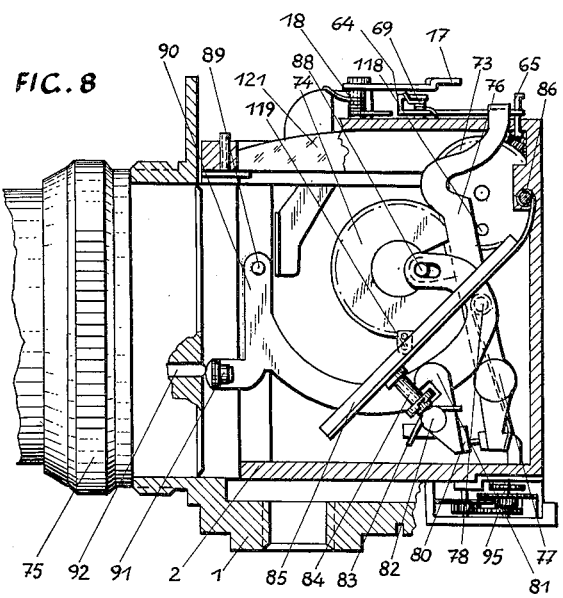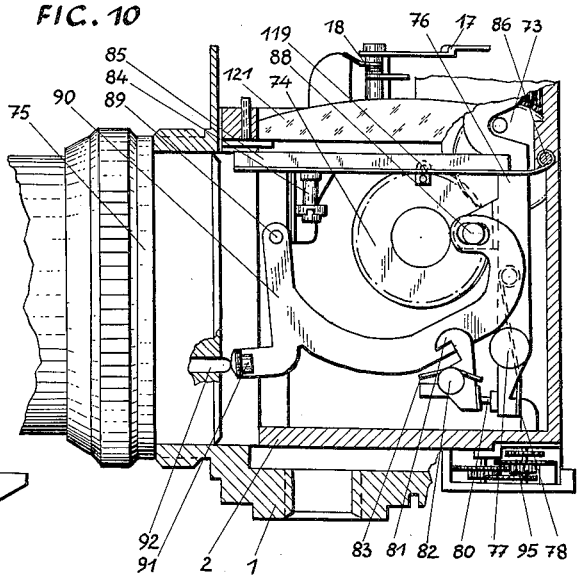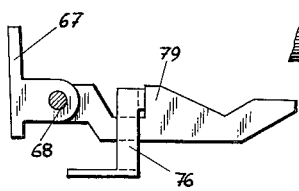

Aug. 27, 1963    S. BÖHM ET AL    3,101,657
PHOTOGRAPHIC CAMERAS FITTED WITH FOCAL PLANE SHUTTER
Filed Sept. 19, 1957    7 Sheets-Sheet 5

INVENTOR.
Siegfried Böhm
BY Friedrich Winkler
Horst Fischer ited States Patent Office 3,101,657
Patented Aug. 27, 1963

3,101,657
PHOTOGRAPHIC CAMERAS FITTED WITH
FOCAL PLANE SHUTTER
Siegfried Böhm, Friedrich Winkler, and Horst Fischer, Dresden, Germany, assignors to VEB Kamera- und Kinowerke Dresden
Filed Sept. 19, 1957, Ser. No. 684,874
15 Claims. (Cl. 95—42)

This invention relates to a photographic camera fitted with a focal plane shutter.

The invention consists chiefly in the particular arrangement, construction and operation of the driving gear of the shutter in connection with the adjusting and regulating of exposure time of the shutter. Furthermore, means are provided which when a reflex device is used in conjunction with a lens having a semi- or fully automatic self-bedding diaphragm, the means effect automatic movement of the mirror into and out of reflex position and automatic control of the self-bedding diaphragm of the lens. The time during which these operations occur can be influenced, moreover, by additional delayed action release means.

In known photographic cameras equipped with a focal plane shutter the driving gear for the film-feed and shutter and the arrangements for adjusting and regulating exposure time are as a rule disposed on one side of the camera in the space above the take-up spool. As this space is quite small, it is necessary to place the various gears and devices concerned within and above one another with the result that the structure is not clearly arranged, complicated and its over-all height is considerable.

Another disadvantage is that actuation and adjustment of the different devices, like the shutter winding gear and film-feed mechanism, obstruct the exposure-time setting means and counter during operation and are accessible only with difficulty. This applies particularly to cameras, in which optical measuring and finder systems or reflex arrangements are used, since such parts restrict the laterally available space even more.

The invention proposes to avoid these disadvantages by arranging the driving gear for the shutter and film-feed mechanism on one side of the camera, preferably within the space above the take-up spool, and by arranging separately therefrom the means for adjusting and regulating exposure time, preferably in the space over the film unwinding spool on the other side of the camera. This arrangement ensures low over-all height and easy access to the shutter setter and film-feed mechanism as well as to the exposure adjusting and regulating means.

It affords the added advantage that the gears and their parts can be of sturdy make, which has a favorable effect upon proper functioning and manufacture and permits also the provision of measuring, finder and reflex devices with large cut-outs. Connection between the shutter gear and the exposure adjusting and regulating means is established by a plurality of members one of which regulates the shutter motion in connection with the exposure adjusting means and is so constructed so as to have a regulating effect due to its mass and inertia. The constant effect obtained thereby considerably reduces scattering of the exposure time relative to the adjusted time values.

As stated before, means are provided which when a reflex device and a lens having a semi- or fully automatic self-bedding diaphragm are used effect automatic movement of the mirror into and out of reflex position and automatic control of the self-bedding diaphragm of the lens. The time during which these operations occur can be influenced by an additionally provided delayed action device. The mode of operation of this device according to the invention is such that after the release thereof the member effecting release of the shutter, mirror and self-bedding lens diaphragm releases a brake mechanism regulating the duration of release, but remains itself inoperative until the brake mechanism on running off releases it. Owing to this arrangement and operation in connection with the delayed-action device, reliable control of the releasing operation for short and long time intervals is attained.

According to the invention, the entire drive of the camera, as for instance the shutter gear and shutter setter, the film-feed mechanism, the arrangements for adjusting and regulating exposure time and if necessary the reflex outfit and the means for releasing the self-bedding lens diaphragm and the delayed-action device, are together disposed on a common carrier inserted with this load in the camera body and held therein by preferably detachable connections. The use of the carrier affords the great advantage that both the mounting of the entire drive of the camera and setting of the various controls can be performed outside the camera casing, and any repair work thereby is simplified.

The invention provides also a locking mechanism which has the effect that the common drive for shutter, film-feed, mirror and lens release can be actuated only when the shutter is run down and remains locked until the next release occurs.

According to the invention, the locking mechanism chiefly comprises a lever formed as a locking member and projecting with its locking face into the range of motion of a hand lever constructed as high-speed setter and thereby releasing and locking its motion. The lever formed as a locking member is controlled by and dependent upon the lever locking and releasing the running of the shutter and actuated by the reflex mirror at the end of its motion. In this way operation of the driving gear is initiated and possible only after all other functions of the camera have been performed and the setting of the gear remains locked until the next release and subsequent running of the driving gear. This mode of operation, as each setting is followed by a release, prevents the production of blanks and also the possibility of gear troubles due to premature winding if carried out prior to the performance of all functions.

The invention is illustrated by way of example in the accompanying drawings showing a photographic camera fitted with focal plane shutter and reflex device, wherein FIGURE 1 is a sectional front view of the camera and the arrangement of a common carrier for the driving gear of the camera;

FIGS. 3 to 5 show details of the arrangement and mode of operation of the means for regulating shutter times;

FIGS. 6 to 7 show details of the arrangement and mode of operation of the setting B-release;

FIGS. 8 to 11 are sectional side views of the arrangement and mode of operation of the reflex device with release of the self-bedding diaphragm;

Figure 1:
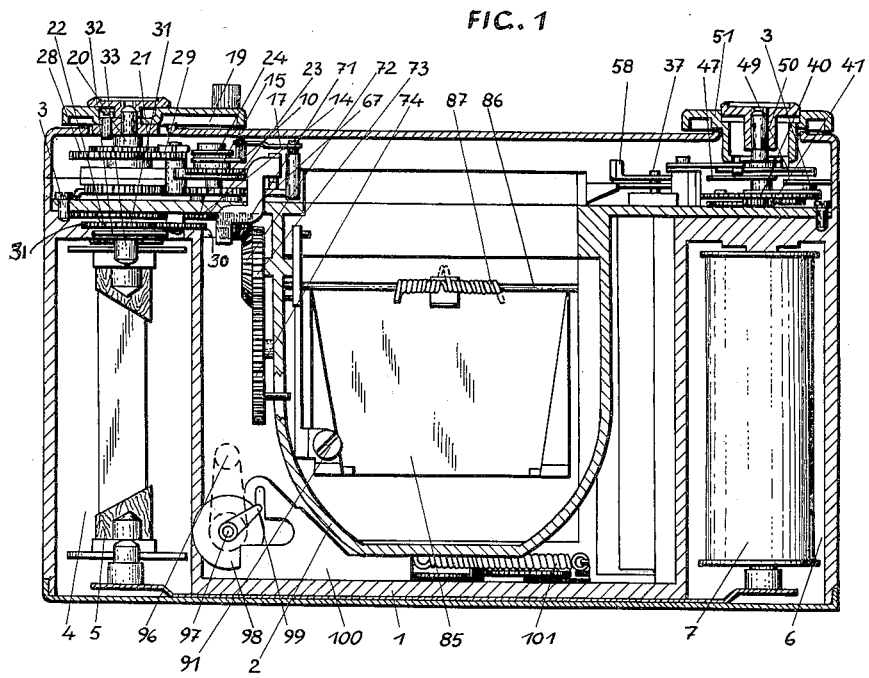
Figure 2:
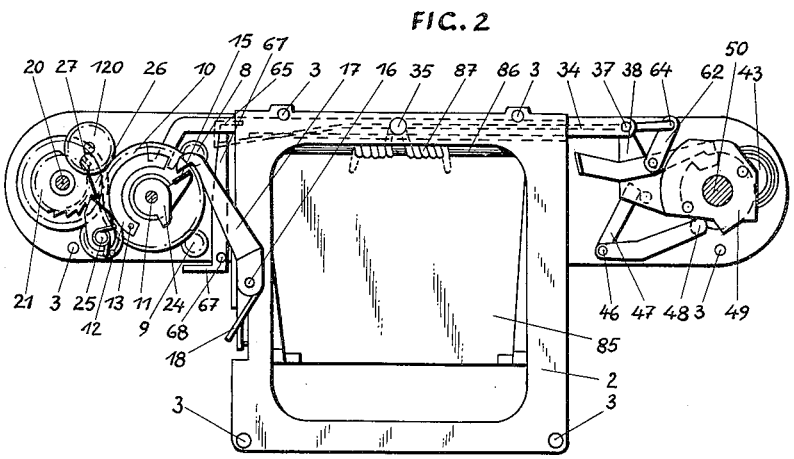
FIG. 2 is a top view of the carrier with shutter and brake mechanism.

A carrier 2 holding the entire driving gear of the shutter, the film-feed, the reflex arrangement and the delayed-action release is so constructed that together with these drives and devices it can be inserted in a camera body 1 and is held therein by preferably detachable connections, as screws 3. In the camera body 1 there are also located a space 4 for a take-up spool 5 and a space 6 for an unwinding spool 7. The shutter is of the focal plane type operating with two curtains, one curtain being provided to open the gate for exposure while the other curtain closes the gate upon termination of the exposure. Each curtain has a roller and is driven by gears 8 and 9 coaxially secured to said rollers. The rollers and curtains which are well-known in the art are not shown.

The two curtain rollers associated with gears 8 and 9 are also journaled in the carrier 2. The first curtain which, when released, uncovers the picture gate, is driven by way of the gear 7 by a shutter wheel 10 rotatably mounted on a driving shaft 11. The shutter wheel 10 has an annular recess 12 engaged by a pin 13 of another shutter wheel 14 which is similarly rotatably mounted on the shaft 11. The wheel 14 meshes with the gear 9 and thus effects actuation of the second curtain which, upon being released, closes the picture gate. With the shutter wheel 10 a locking cam 15 is connected which cooperates with a locking lever 17 arranged about a fulcrum 16, said locking lever being moved into locking position by a spring 18. By means of the locking lever 17 and by way of the locking cam 15 the run of the shutter wheel 10 and thereby the entire driving gear of the shutter is locked or released.

A ratchet wheel 21 and a pair of lower gear wheels 22 are fixedly connected to a high-speed setting lever 19 by means of a shaft 20. The ratchet wheel 21 cooperates with a pawl 25 which during winding prevents back sliding of setting lever 19 and will only release the same when the shutter has been completely re-set. Gear wheels 22 drive a gear 23 which, by means of shaft 11, is secured to a driver 24. In the winding movement, driver 24 takes along the run-down shutter wheel 10 by striking against locking cam 15 and thus drives the entire mechanism to locking position. Simultaneously, the shutter wheel 14 is taken along since the pin 13 engages the recess 12 of shutter wheel 10 and the second curtain is thereby raised by way of drive gear 9.

Figure 12:
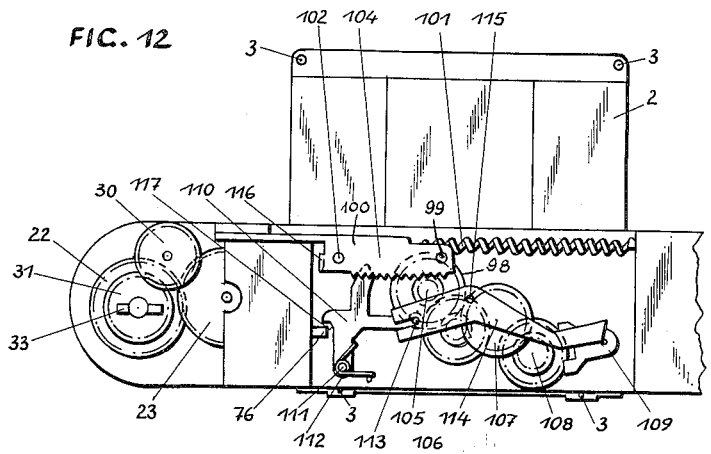
FIGS. 12 and 13 show the arrangement and mode of operation of the delayed-action device.
Figure 13:
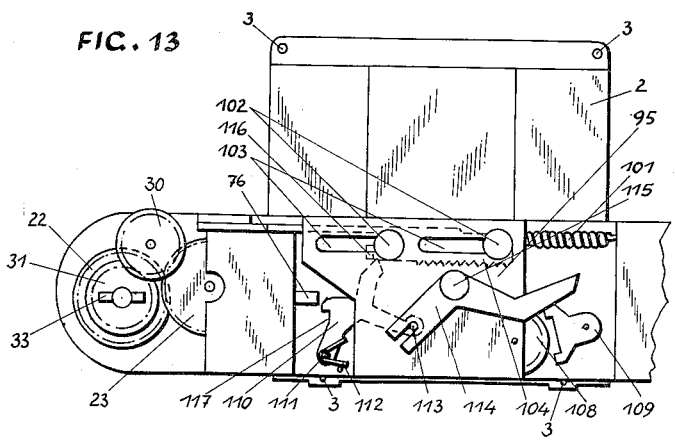
Figure 14:
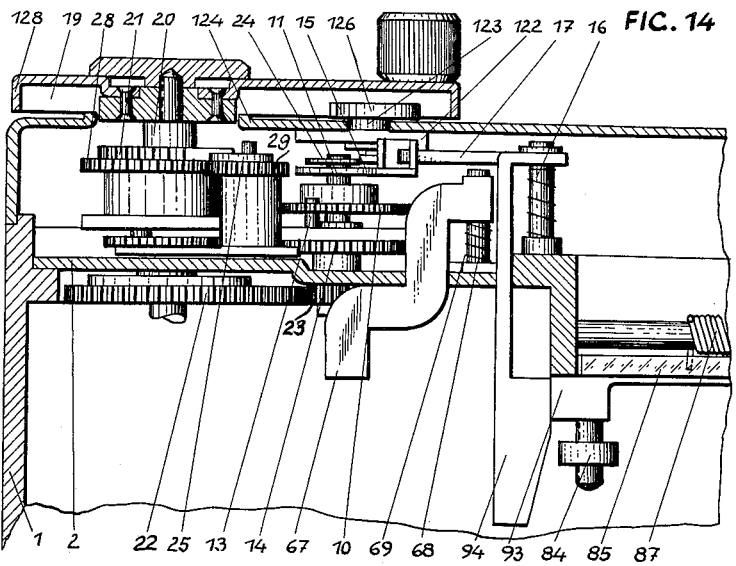
FIG. 14 is a front view, partly in section, of a part of the camera with the locking means.
Figure 15:
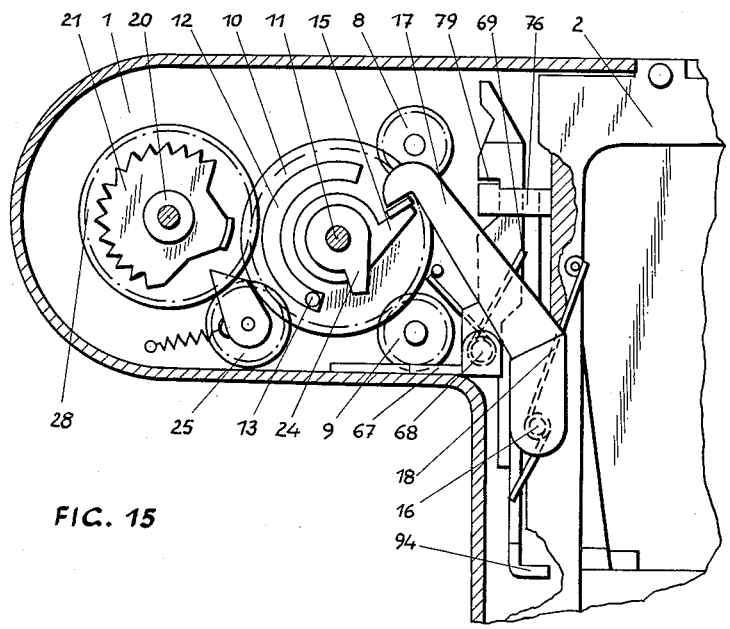
FIG. 15 is a top view of FIG. 14 with details of the locking device.
Figure 16:
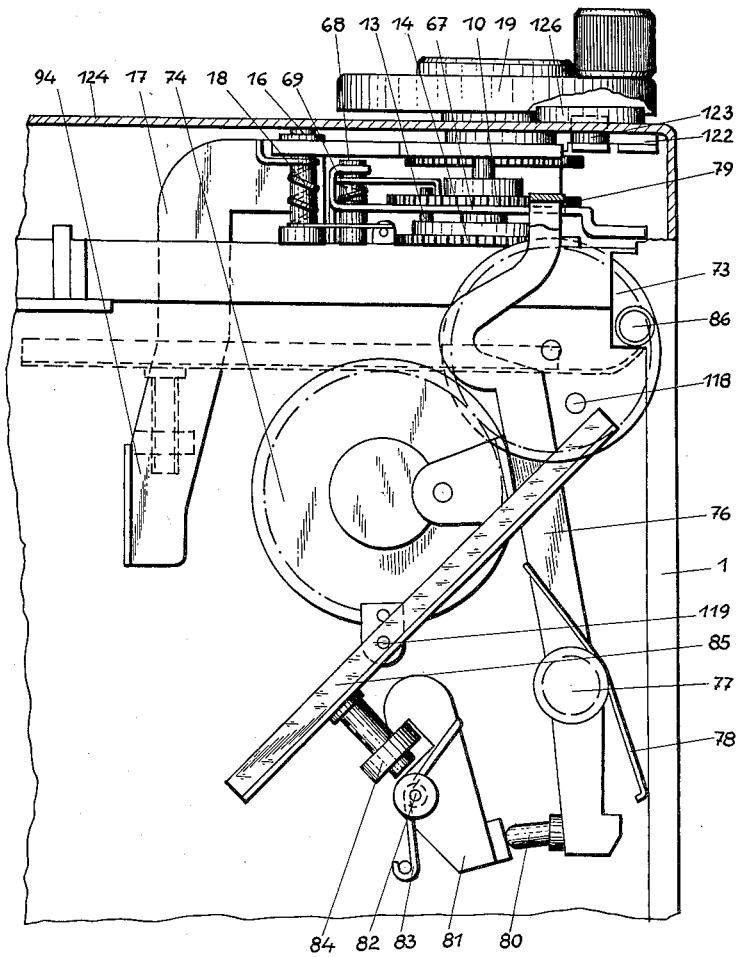
FIG. 16 is a side view of FIG. 14 with the reflex device in section.

With the high-speed setting lever 19 the film-feed is also actuated. For this purpose the ratchet wheel 21 is also provided with an annular recess 26 which is engaged by a pin 27 of the gear wheel 28 arranged below which is rotatable on shaft 20. With the gear wheel 28 gear wheels 29, 30 are connected, the latter driving a gear wheel 31, see FIGS. 12 and 13. The gear 31, by means of a friction clutch 32, takes along a driver 33 of the take-up spool 5.

The friction coupling comprises a spring 32 which is connected with the driver 33 so as to be frictionally driven and so that in spite of the continuous change of diameter in the winding film, a secure winding will be assured. When the lever 19 is returned, the spring 32 is wound and thus causes decoupling from driver 33.

The spring 32 has an upturned end which is anchored in the gear 31. Gear 31 is driven by the high-speed setter 19 through the gears 28, 29 and 30. The spring 32 surrounds the hub of the driver 33 of the take-up reel 5. During the winding of the high-speed setter 19, the spring 32 tightens around the hub of the driver 33 and thus frictionally engages the driver 33 to effect the winding of the film. During the return of the high-speed setter 19, the spring 32 releases the hub of the driver 33. Consequently the take-up reel is rotated during the winding motions of the high-speed setter 19 but does not rotate during its release. Hence the frictional engagement of the spring 32 and the hub of the driver 33 operate as a one-way clutch. Other types of known one-way clutches may be substituted for this particular design.

FIGS. 1, 2, 12 and 13 show that the driving gear for shutter and film-feed mechanism lies above space 4 of the spool, and on the other side of the camera body 1 the means for adjusting and regulating exposure time are disposed above spool space 6. Connection between these arrangements is effected by a control lever 34 movable about a fulcrum 35 and projecting with its bent end into the recess of an annular elevation 36 of the shutter wheel 14. With its other end the control lever 34, by means of a pin 37, engages the subsequently described members of a brake device, which according to their adjustment have a retarding effect and thereby a corresponding influence upon the run of shutter wheel 14 and thus upon exposure.

For obtaining long exposure times of, say $\frac{1}{25}$ to 1 second a brake device is used comprising a toothed segment 38 and drivers 39, 40, and anchor wheels 41 and anchor 42 connected therewith, which is returned to initial position by a spring 43. To the toothed segment 38 moving about a fulcrum 44 a pin 45 is secured against which bears a bell crank lever 47 movable about a fulcrum 46, which with its other arm by means of a pin 48 lies against a cam disk 49 firmly connected with a time setting knob 51 by a shaft 50. Owing to this arrangement, the toothed segment 38 of the brake device, by means of time setting knob 51 and by way of cam disk 49 and bell crank lever 47, can be moved more or less or completely into and out of the swinging range of connecting lever 34 or its pin 37, whereby the run of the shutter wheel 14 is correspondingly influenced.

To obtain shorter exposure times, for instance of $\frac{1}{50}$ to $\frac{1}{25}$ second, the retardation due to anchor 42 can be removed and the driving gear act without retardation. The anchor 42 is therefore movably secured on a one-arm lever 52 arranged about a fulcrum 53 and carrying a pin 54 which bears against a cam disk 55 firmly connected with time setting knob 51 by way of shaft 50. By the cam disk the correspondingly adjusted anchor 42 is brought into and out of engagement with the anchor wheel, a spring 56 moving lever 52 into the anchor engaging position.

To obtain still shorter exposure times of $\frac{1}{250}$ to $\frac{1}{500}$ second, after disconnection of the brake device as described above, a cam disk 57 firmly connected with the time setting knob 51 by way of shaft 50 becomes effective and a double-armed short time lever 58 which abuts against disc 57 and is arranged about a fulcrum 59 is moved by the action of a spring 60 with its other arm into swinging range of the connecting lever 34 or its pin 37. At this as well as other time adjustments the connecting lever 34, owing to its long arm and the consequent moments of mass and inertia, acts also as regulator having the advantage of constant operation, whereby the hitherto unavoidable variations relative to the adjusted time are considerably reduced.

In case of exposures of $\frac{1}{1000}$ second it is advisable to disconnect besides all brake devices also the connecting lever 34 so as to be outside the range of shutter member 14 and ineffective at this setting. The two curtains will then roll off without retardation, since the shutter has been released by its own gear.

For B-setting serves the following arrangement: With the time setting knob 51 is connected also by shaft 50 a recessed setting disk 61 which cooperates with a bell crank lever 62 disposed about a fulcrum 63. To one arm of the bell crank lever 62 a locking member 64 is secured which at its other end has a pawl 65 cooperating with a strap 66 provided on the connecting lever 34.

A releasing lever 67 bears against a pawl 65 and is arranged about a fulcrum 68 and by the action of a spring 69 simultaneously moves the locking member 64 with its pawl 65 out of the range of motion of the strap 66, as indicated in FIG. 6. In B-position the setting disk 61 with its recess is so placed that the bell crank lever 62 can drop into the recess by the action of a spring 70. This movement, however, is at first prevented by the strong spring 69 of the release lever 67 articulated to the pawl 65 of locking member 64. During release occurring in the direction shown by the arrow, the releasing lever 67 moves to the right so that the articulated locking member 64 due to the bell crank lever 62 and the action of spring 70 can follow. At this motion the pawl 65 engages the strap 66 of the connecting lever 34 and locks it so that running-off of the shutter wheel 14 and thereby that of the second curtain is impeded. Release is effected during the return motion of the releasing lever 67.

The shutter gear is driven by means of the gear wheel 23 and the gearing comprising two bevel gears 71, 72 and gear wheels 73, 74 connected therewith, which are all also arranged on carrier 2. This gearing effects the drive of the reflex device and actuation of a lens 75 preferably provided with a semi- or fully automatic self-bedding diaphragm. The reflex device consists of a tension lever 76 placed around a fulcrum 77 and moved by a spring 78. The tension lever 76 is in connection at one end with the releasing lever 67 which by means of a catch 79 keeps the tension lever 76 locked in tensioned condition, as indicated in FIG. 11. On the other arm of the tension lever 76 a preferably adjustable thrust bolt 80 is provided which acts against a pawl 81 arranged about a fulcrum 82 and moved each time into locked position by a spring 83. The pawl 81 when in locking position embraces a similarly preferably adjustable bolt 84 of a mirror 85 in its reflex position of 45°, which is movably placed about a fulcrum 86 and when released is moved upwardly by a spring 87, as shown in FIGS. 8 and 10. To the tension lever 76 a pin 88 is also secured by means of which a lever 90 is actuated, the lever 90 turning about a fulcrum 89 and serving for release of the self-bedding diaphragm arrangement of the lens 75. On lever 90 a preferably adjustable thrust bolt 91 is also provided which strikes a pin 92 intended for the release of the self-bedding diaphragm. On the mirror 85 or its holder a strap 93 is laterally arranged, as shown particularly in FIG. 9, which at release of the mirror 85 from its reflex position strikes during this movement against an incline 94 forming part of the locking lever 17 and moves it out of locking position, whereby the shutter gear is released and capable of running off.

With its other lever arm the tension lever 76 is connected with a delayed-action device 95 which as shown is disposed at the bottom of the carrier 2. The delayed-action device 95 essentially consists of a setting lever 96 with a bearing shaft 97 of which a crank disc 98 is firmly connected whose pin 99 actuates a slide 100 which is subject to the action of a spring 101. The slide 100 is guided by two bolts 102 in slots 103 of a sheet bar and with its wrapped part formed as a rack 104 by which a brake mechanism comprising driving gears 105, 106, 107, an anchor wheel 108 and an anchor 109 receives its drive. The delayed-action device 95 possesses a multi-armed locking lever 110 around a fulcrum 111, which is moved each time into locking position by a spring 112. The locking lever 110 is connected by a pin 113 with a two-armed lever 114 arranged about a fulcruum 115 and with its other end locks or releases the movement of the anchor 109. The middle arm comes moreover within a range of motion of a strap 116 secured to rack 104 and thereby moving the locking lever 110 out of locking position.

During release of the tension lever 76 its end slides at first along an incline 117 of the locking lever 110 and thereby moves the latter to an extent that the lever 113 releases anchor 109. Now the brake device is activated by the action of spring 101, but the locking lever 110, in spite of it, still holds the tension lever 76 by means of its nose. Release from this locking position occurs only when, in the course of further running-off movement, the rack 104 with its strap 116 has moved the tension lever 110 fully out of its locking position.

The return movement of the released tension lever 76 to its tensioning position and also the return of the released mirror 85 to its reflex position take place simultaneously at the setting of the gearing by the high-speed lever 19, lever 76 being moved into the mentioned position by a pin 118 secured to gear wheel 73 and mirror 85 being moved into its position by a driver 119 secured to gear wheel 74. By the shutter gear a counter may be actuated which is driven by a gear wheel 120. The rays coming from the lens 75 are passed by way of the mirror 85 to an image field lens 121, and additional optical means may be provided for viewing an upright and laterally reversed image.

Figure 17:
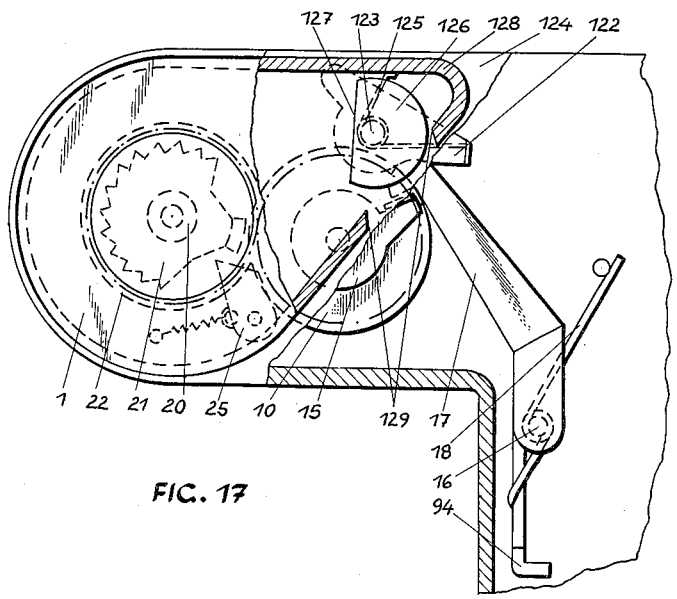
FIG. 17 is a top view of FIG. 15 with set shutter and locked high-speed setter.
Figure 18:
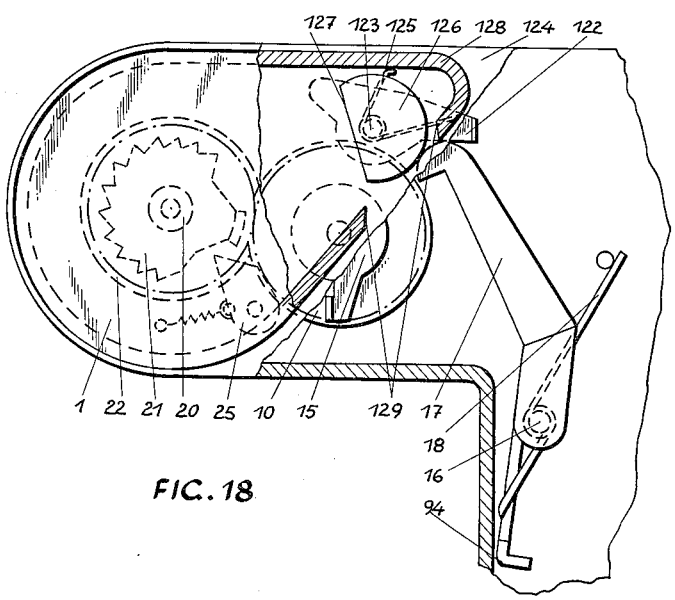
FIG. 18 is a top view of FIG. 17 when the shutter is run down and the high-speed setter released.

A further locking device prevents actuation of the setting of the common driving gear for shutter, film-feed mechanism and release of the mirror and diaphragm unless the shutter has run out and is locked until the next release. In accordance with this locking arrangement a control lever 122 cooperates with locking lever 17, turns about a fulcrum 123 of a cover cap 124 and by the action of a spring 125 bears against the locking lever 17. Lever 122 is connected with a member 126 having a tangential face 127 and being located below the hollow high-speed setting lever 19 so as to lie within its range of motion. Lever 19 has a downwardly drawn edge 128 corresponding to its form, said edge having a recess 129 within range of control member 126, the recess 129 being so arranged and shaped that the high-speed lever 19 during its movement strikes member 126 in its position according to FIG. 17, whereby the setting motion is locked or hindered. When the control member 126 is in the position shown in FIG. 18, the setting motion is not interfered with.

The locking arrangement operates as follows:

When the shutter is wound, the parts of the arrangement occupy the position shown in FIGS. 14 to 17. Running-off of the shutter is prevented by the locking lever 17 which has also moved the adjacent control lever 122 into a position where its member 126 prevents movement of the high-speed setter. As in this position setting of the shutter gear and of the film-feed is not possible, no blanks can be formed, and the situation is such that a release is necessary before setting can take place. During this release effected by actuation of the lever 67 its catch 79 releases the setting lever 76 which by the action of spring 78 brings the mirror 85 out of its reflex position. The mirror at the swing by the strap 93 which strikes against the incline 94 of the lever 17 releases the latter so that the shutter can run off. Simultaneously with this motion the locking lever 17 turns the articulated lever 122 whose control member is thereby moved into a position permitting the performance of the setting motion, during which all functional members are returned to their initial position.

The invention is not restricted to the example of construction shown, but may be applied also to photographic cameras which do not possess a reflex device or do not use a self-bedding diaphragm. When the invention is applied to such cameras, the arrangement of the means for the reflex device and the release of the self-bedding diaphragm is, of course, omitted. In this simplified design the release of the shutter can be effected also by forming the release lever 67 so as to serve also as a locking lever for the shutter wheel 10 so that at its actuation the shutter wheel 10 is released and simultaneously also the B-setting is controlled. This mode of operation can be attained also by coupling the releasing lever 67 with the locking lever 17.

We claim:

1. In a photographic camera having a housing, an objective lens in said housing, a film supply spool on one side of the optical axis of said objective lens and a film takeup spool on the other side of said optical axis, said spools being adapted to support a film in the path of the light passing through said objective lens, a focal-plane shutter including a pair of curtains movable across the face of said film, the first of said curtains being an opening curtain and the second of said curtains being a closing curtain, reflex means in said housing movable into and out of said optical axis, the improvement comprising drive gear means positioned adjacent one of said film spools and connected to said shutter, said reflex means, and said film takeup spool for operatively driving said shutter, moving said reflex means and advancing said film, a settable, self-contained timing device in said housing adjacent said other film spool, and connecting means extending between and engageable with said drive gear means and said timing device for engaging said drive gear means in response to the setting of said timing device and preventing the operation of said second curtain after said first curtain has exposed said film, and for releasing said second curtain after a predetermined time in response to the action of said timing device so as to complete the exposure of said film.

2. In a photographic camera having a housing, an objective lens in said housing, a shutter mechanism including two movable curtains for admitting light through said objective lens, a shutter wheel for each of said curtains, recess means on one of said shutter wheels associated with the closing curtain for receiving a locking member capable of preventing rotation of said one shutter wheel, spring actuated reflex means operatively mounted in said housing and movable to a position which is in the path of the optical axis of said objective lens, film feed mechanism in said housing including a film supply spool mounted on one side of said optical axis and a film takeup spool mounted on the other side of said optical axis, the improvement comprising drive gear means positioned in said housing adjacent one of said film spools on one side of said optical axis for actuating said film feed mechanism, said reflex means, and said shutter mechanism, a settable, self-contained timing device including an escapement mechanism positioned in said housing adjacent the other of said film spools on the other side of said optical axis, and connecting means for establishing connection between said drive gear means and said timing device and including a two-armed lever pivotally mounted in said housing, one arm of said lever including a locking claw extending into said recess means and thereby preventing rotation of said shutter wheel according to a predetermined exposure time, the other arm of said lever being connected and responsive to said escapement mechanism.

3. In a photographic camera, the improvement as set forth in claim 2, further comprising means in said housing for effecting the B-setting and release of said shutter mechanism, said last-named means being positioned to lock said lever in the locking position.

4. In a photographic camera, the improvement as set forth in claim 3, wherein said means for effecting the B-setting includes a connecting arm releasably locking the movement of said lever, and a release lever operatively connected to said shutter mechanism for disengaging said connecting arm from said lever.

5. In a photographic camera, the improvement as set forth in claim 4, wherein said release lever is in engagement with a switching member operatively connected to said shutter mechanism, and thereby releases the same.

6. In a photographic camera, the improvement as set forth in claim 5, further comprising a plurality of adjustable thrust bolts operatively connected to said switching member for movement of said reflex means between a viewing and a taking position.

7. In a photographic camera, the improvement as set forth in claim 6, further comprising a releasable delay action device mounted in said housing, said switching member being connected to said delay action device for release thereof and being locked for the duration of the time of adjustment of said delay action device.

8. In a photographic camera, the improvement as set forth in claim 7, wherein said delay action device includes a plurality of adjustable delaying gears rotatably mounted in said housing in meshing engagement with each other, further comprising a locking lever pivotally mounted in said housing in operative engagement with said delaying gears and said switching member, said locking lever when releasing said delaying gears locking said switching member until the time interval set at the delaying gears has elapsed and then releasing said switching member.

9. In a photographic camera, the improvement as set forth in claim 2, further comprising return means mounted in said housing for returning said reflux means to their initial position at the setting of said shutter mechanism and said film feed mechanism by said drive gear means.

10. In a photographic camera, the improvement as set forth in claim 2, further comprising locking means in said housing for releasing the setting of the drive gear means for said shutter mechanism, said film feed mechanism and said reflex means only after the runoff of said shutter mechanism.

11. In a photographic camera, the improvement as set forth in claim 10, wherein said locking means is controlled by the movement of said reflex means.

12. In a photographic camera, the improvement as set forth in claim 11, wherein said drive gear means is integral with said locking means.

13. In a photographic camera, the improvement as set forth in claim 12, wherein said locking means includes a control member disposed within the range of the setting movement and at release of said shutter mechanism by said locking member is moved into position, whereby said setting movement is released.

14. In a photographic camera, the improvement as set forth in claim 13, wherein said control member has a tangential surface which locks and releases said setting movement.

15. In a photographic camera, the improvement as set forth in claim 14, further comprising a cover cap on said housing, said locking means being mounted on said cover cap.

References Cited in the file of this patent

UNITED STATES PATENTS

| | | |
|---|---|---|
| 734,692 | Fraley | July 28, 1903 |
| 1,075,101 | Heidecke | Oct. 7, 1913 |
| 1,374,794 | Wolf | Apr. 12, 1921 |
| 1,381,241 | Roberds | June 14, 1921 |
| 1,980,546 | Petit et al. | Nov. 13, 1934 |
| 2,206,105 | Mihalyi | July 2, 1940 |
| 2,257,424 | Meyer | Sept. 30, 1941 |
| 2,273,386 | Steiner | Feb. 17, 1942 |
| 2,298,787 | Fassin | Oct. 13, 1942 |
| 2,392,071 | Terrett et al. | Jan. 1, 1946 |
| 2,504,011 | Dunlap | Apr. 11, 1950 |
| 2,608,921 | Studdert | Sept. 2, 1952 |
| 2,880,661 | Kaden et al. | Apr. 7, 1959 |

FOREIGN PATENTS

| | | |
|---|---|---|
| 25,849 | Great Britain | Nov. 30, 1908 |